United States Patent
Ogawa et al.

(10) Patent No.: US 6,854,723 B2
(45) Date of Patent: Feb. 15, 2005

(54) ELASTIC BUSH AND METHOD OF PRESS-FITTING ELASTIC BUSH

(75) Inventors: Tetsu Ogawa, Wako (JP); Kazutaka Suzuki, Wako (JP); Keiichi Sunami, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/332,981

(22) PCT Filed: Jul. 12, 2001

(86) PCT No.: PCT/JP01/06057
§ 371 (c)(1),
(2), (4) Date: Jan. 23, 2003

(87) PCT Pub. No.: WO02/12748
PCT Pub. Date: Feb. 14, 2002

(65) Prior Publication Data
US 2003/0111780 A1 Jun. 19, 2003

(30) Foreign Application Priority Data

Aug. 4, 2000 (JP) .................................. 2000-236563
Aug. 4, 2000 (JP) .................................. 2000-236564
Aug. 4, 2000 (JP) .................................. 2000-236565

(51) Int. Cl.$^7$ ............................................. B60G 11/22
(52) U.S. Cl. ................ 267/293; 267/141.5; 267/140.12
(58) Field of Search .......................... 267/293, 141.5, 267/140.12, 140.4, 140.5, 141.4, 141.2, 141.1, 270, 280, 281, 282, 294

(56) References Cited

U.S. PATENT DOCUMENTS 5,158,271 A   10/1992   Hein
5,181,736 A * 1/1993   Kokubun ................ 267/293
5,503,376 A * 4/1996   Simuttis et al. ........ 267/293
5,967,668 A * 10/1999  Germano ............... 267/293

FOREIGN PATENT DOCUMENTS

| EP | 0 864 773 A1 | 9/1998 |
| JP | 61-109938 | 7/1986 |
| JP | 61-205726 | 12/1986 |
| JP | H7-41091 | 7/1995 |
| JP | 63-198840 | 12/1998 |
| JP | 2000-110877 | 4/2000 |

* cited by examiner

Primary Examiner—Robert A. Siconolfi
Assistant Examiner—Melanie Torres
(74) Attorney, Agent, or Firm—Westerman, Hattori, Daniels & Adrian, LLP

(57) ABSTRACT

An outer sleeveless type resilient bush wherein a resilient body fixed to the outer circumference of an inner sleeve is brought into contact with the inside face of a support hole of an article to be supported, an inserted sleeve being embedded in the resilient body, axial notches and split grooves are respectively formed on the inserted sleeve and the resilient body. flanges that bend in the diametrically outwards direction are formed at both ends of the inserted sleeve, and arranged to extend outwards in the diametrically outwards direction and the flange at one end is made capable of reduction in diameter, so that the resilient bush can be inserted into the support hole from the side of this flange, and resistance to withdrawal from the support hole can be increased and performance is improved by making the initial compression ratio of the resilient body large.

11 Claims, 12 Drawing Sheets

ELASTIC BUSH AND METHOD OF PRESS-FITTING ELASTIC BUSH

TECHNICAL FIELD

The present invention relates to a resilient bush employed to, by fitting into a support hole formed in the article to be supported such as a suspension arm, resiliently support the article and to a method of pressure-insertion of this resilient bush into a support hole.

BACKGROUND ART

Conventionally, a resilient bush that is used to support a suspension arm typically comprises an inner sleeve, a resilient body fixed to the circumference of this inner sleeve, and an outer sleeve fixed to the circumference of the resilient body; fixing is effected by pressure-insertion of the outer sleeve into a support hole formed in the suspension arm; however, with this bush, metallic members constituted by the suspension arm and outer sleeve are fitted together by insertion, so precise processing of the inside face of the support hole of the suspension arm is required, increasing processing costs, and making it necessary to use a high pressure-insertion load, which increases the equipment cost of the pressure-insertion device; in addition, the unit cost of the bush itself is raised by the provision of the outer sleeve, making it difficult to achieve reduction in costs.

Resilient bushes are also conventionally known of the outer-sleeveless type, wherein the resilient body is made to directly contact the inside face of the support hole of the suspension arm, dispensing with the outer sleeve. With these bushes, the processing precision of the inside face of the support hole need only be rough and the pressure-insertion load can be low, so equipment costs are lowered and, in addition, the unit cost of the bush itself is lowered, making possible considerable cost savings.

In both resilient bushes of the outer sleeveless type and the type fitted with an outer sleeve, resilient bushes are known, wherein an inserted sleeve is embedded in a diametrically intermediate region of the resilient body, in order to raise the spring constant of the resilient bush in the diametrical direction.

Although resilient bushes of the outer sleeveless type referred to above have the advantage of enabling cost savings to be achieved as described above, they have the severe drawback that, since fixing to the article to be supported such as the suspension arm is obtained solely by the degree of tightening of the resilient body that can be achieved, the withdrawal load that they can withstand is greatly lowered compared with bushes of the type fitted with an outer sleeve, hence they cannot be employed in locations where they are subjected to load in the withdrawing direction or where they are subjected to complex inputs. Also, because of considerations regarding ease of pressure-insertion and shape stability after insertion (protrusion of the resilient body etc), the volume of the resilient body of the bush must be restricted, but, as a result, the initial compression ratio of the resilient body is limited so, even though an inserted sleeve is embedded in the resilient body, it is inferior in regard to spring balance performance in the diametrical direction, axial direction and torsional direction compared with a bush of the type fitted with an outer sleeve.

In view of the above, an object of the present invention is to provide a resilient bush of the outer sleeveless type, wherein the withdrawal load is large and, furthermore, performance can also be improved.

DISCLOSURE OF INVENTION

In order to attain the above object, according to the present invention, a resilient bush used to, by fitting into a support hole formed in an article to be supported, resiliently support the article, comprises: an inner sleeve; a resilient body that directly contacts the inside face of the support hole and is fixed to the outer circumference of the inner sleeve; and a inserted sleeve embedded in a diametrically intermediate part of the resilient body, wherein flanges bent in the diametrically outwards direction are formed at both ends of the inserted sleeve, the flanges at both ends extending in the diametrically outwards direction from a projection plane in the axial direction of the support hole in a condition in which the resilient bush is fitted into the support hole; and a notch extending in a tubular portion of the inserted sleeve are formed in at least part, in the circumferential direction, of the flange at one end such that the flange at one end is capable of being reduced in diameter the flange at one end being one of the flanges at both ends which is, positioned at the leading end of the resilient bush in the direction of insertion of same with respect to the support hole.

According to the present invention, the resilient bush is pressure-inserted into the support hole of the article to be supported from the flange at one end of the inserted sleeve, in a condition with the flange at one end reduced in diameter. In this way, the flange at one end is expanded in diameter at the point where this flange is extracted from the support hole. Thus, resistance to withdrawal to one side or the other side in the axial direction of the resilient bush is obtained by means of the flange at one end and the flange at the other end, thereby providing a large withdrawal load. Also, since the contact with the inside face of the support hole is made by the resilient body, in contrast to pressure-insertion fitting of metal members as in the type fitted with an outer sleeve, the precision of processing of the inside face of the support hole can be rough, and the pressure-insertion load can also be small, making it possible to achieve pressure-insertion with pressure-insertion equipment of small size.

Also, in order to raise performance, it is desirable to increase rigidity in the diametrical direction while keeping the spring constant in the axial direction and torsional direction of the resilient body low; in order to achieve this, the diametrical compression ratio of the resilient body in the initial condition thereof, in which the resilient bush is fitted into the support hole, must be made large. In this case, if the diameter of the one-end flange in the free condition of same prior to fitting the resilient bush into the support hole is made larger than the diameter when the resilient bush has been fitted into the support hole, compression of the resilient body in the diametrical direction in the initial condition can be achieved in particular, compression in the diametrical direction of the portion of the resilient body on the inside of the inserted sleeve can be achieved. Thus, by making the initial compression ratio of the resilient body large, performance can be improved.

Also, if a split groove, reaching the end face of the leading end in said direction of insertion, is formed in the resilient body in the same phase as the notch, and this split groove and the notch are respectively formed in shapes expanding in width towards the leading end of the direction of insertion, the resilient body and the inserted sleeve can be reduced in diameter so as to become narrower towards the leading end in the direction of insertion, thereby facilitating pressure-insertion of the resilient bush in respect of the support hole. In order to further facilitate pressure-insertion of the resilient bush in respect of the support hole, the flange at one end is preferably formed in elliptical shape with the short-diameter dimension being less than the hole diameter of the support hole and the notch being formed on both sides in the short-diameter direction of this flange.

Also, if a projection is formed projecting in the diametrical direction in a portion of the outer circumferential surface of the resilient body on the opposite side to that of the leading end in the insertion direction, a force tending to diametrically expand the flange at one end by a lever action performed by the compressive force of the projection is generated, thereby reinforcing the withdrawal prevention function.

Incidentally, when the resilient body is subjected to vulcanizing molding, the flanges must be subjected to grasp such that the inserted sleeve does not become offset in position. The location where the flanges are subjected to grasp cannot be covered by the resilient body, so resistance to corrosion is adversely affected. Also, if the portion where the location of application of grasp to the flange at one end coincides with the direction of diameter reduction, i.e. the portion that is most extended in the diametrically outwards direction from the projection plane of the support hole in the condition where the resilient bush is fitted into the support hole, the withdrawal prevention function is adversely affected by corrosion of this portion. It is therefore desirable that the location where the flange at one end is subjected to grasp during vulcanizing molding of the resilient body should be set at a position offset in the circumferential direction from a portion coinciding with the direction of reduction of diameter of this flange at one end.

Also, preferably the resilient body has a tubular portion that directly contacts the inside face of the support hole and is formed with leg portions fixed to the inner sleeve at the inner circumference of an intermediate portion in the axial direction of this tubular portion, and the inserted sleeve is embedded in this tubular portion and the notch is formed in the flange at one end of the inserted sleeve. In this case, a diametrical stopper portion is provided on one of the inner sleeve and the tubular portion of the resilient body that restricts reduction in diameter by abutting the other of the inner sleeve and the tubular portion of the resilient body when the flange at one end is reduced in diameter; alternatively, a split groove in the same phase as the notch and that reaches the end face at the leading end in the direction of insertion of the resilient bush in respect of the support hole is formed in the tubular portion of the resilient body, a wedge member being provided that fit into the split groove; if this is done, diameter reduction of the flange at the one end is restricted, so the withdrawal prevention function of this flange at one end is reinforced.

When the resilient bush is pressure-inserted into the support hole, it is necessary that an annular diameter reduction guide whose internal diameter reduces with approach to the support hole should be arranged at the aperture face on the inlet side of the support hole of the article to be supported, the flange at one end of the inserted sleeve being arranged to be guided into the support hole by diameter reduction performed by pressing the flange into the diameter reduction guide. Thus, in this condition, the diameter reduction guide is subjected to pressure by the flange at the other end of the inserted sleeve on pressure-insertion of the resilient bush; separation of the diameter reduction guide is thereby made impossible.

A second object of the present invention is to provide a method whereby it is made possible to separate the diameter reduction guide after pressure-insertion and whereby smooth pressure-insertion of the resilient bush into the support hole can be achieved using the diameter reduction guide.

In order to attain this object, according to a first characteristic of the method of the present invention, an annular diameter reduction guide, whose internal diameter decreases as the support hole is approached, is arranged at the aperture face on the inlet side of the support hole of the article to be supported, it being arranged to effect guidance into the support hole by reduction in diameter of the flange at one end of the inserted sleeve by pressing the flange into the diameter reduction guide, the diameter reduction guide being constituted by a plurality of segments that can be opened and closed in the diametrical direction, these segments being opened in the diametrical direction after pressure-insertion of the resilient bush; also, according to a second characteristic of the method of the present invention, an annular diameter reduction guide is arranged at the aperture face on the inlet side of the support hole of the article to be supported, and guide projections, the amount of whose projection diametrically inwards increases with approach to the support hole, are provided at a plurality of locations in the circumferential direction of the inner circumference of the diameter reduction guide, the flange at one end of the inserted sleeve being arranged to be guided into the support hole by diameter reduction performed by the guide projections by pressing the flange into the diameter reduction guide and recesses being formed at a plurality of locations in the circumferential direction in the same phase as the guide projections in the flange at the other end of the inserted sleeve, the diameter reduction guide being arranged to be separated in the axial direction such that the guide projections pass through the recesses after pressure-insertion of the resilient bush; and, according to a third characteristic of the method of the present invention, a practically U-shaped diameter reduction guide is arranged at the aperture face on the inlet side of the support hole of the article to be supported, whose internal diameter decreases as the support hole is approached and which opens on one side in the diametrical direction matching the notch, guidance into the support hole being effected by diameter reduction of the flange at one end of the inserted sleeve by pressing the flange into the diameter reduction guide and the diameter reduction guide being arranged to be separated in the direction opposite to the direction of opening of this guide after pressure-insertion of the resilient bush.

According to any of the aforesaid first to third characteristics, the diameter reduction guide can be separated after pressure-insertion of the resilient bush without interfering with the flange at the other end of the inserted sleeve, and smooth pressure-insertion of the resilient bush into the support hole can thus be effected using the diameter reduction guide.

By the way, in pressure-insertion of the resilient bush, the aperture face on the outlet side of the support hole of the article to be supported is contacted to a fixing jig so as to receive the pressure-insertion load of the resilient bush. In this case, a concavity is provided in the fixing jig to receive the flange at one end of the inserted sleeve when this is extruded from the outlet of the support hole on completion of pressure-insertion of the resilient bush, but, when the flange at the one end is extruded from the support hole, this flange is strongly pressed against the inside face of the concavity so as to attempt to effect expansion in the diametrical direction in the direction parallel with the width direction of the notch formed therein and may therefore catch on the fixing jig. Accordingly, according to a fourth characteristic of the method of the present invention, a concavity is formed in elliptical shape whose long-diameter direction is a direction parallel with the width direction of the notch. In this way, diametrical expansion within the concavity of the flange at one end when this is extruded from the support hole is permitted, with the result that this flange does not press strongly against the inside face of the concavity and catching on the fixing jig is thereby prevented.

BEST MODE FOR CARRYING OUT THE INVENTION

Figure 1:
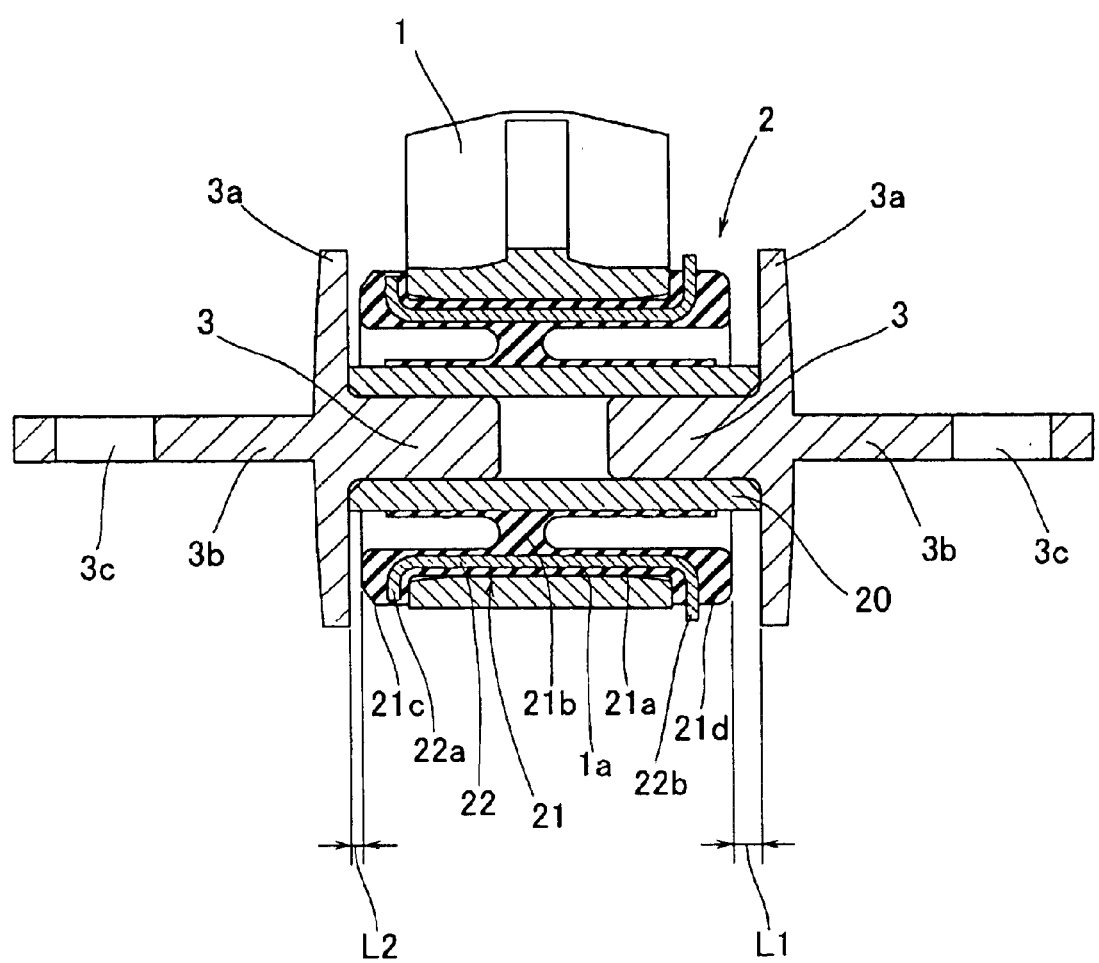
FIG. 1 is a cross-sectional side view of the condition of use of a first embodiment of a bush according to the present invention.

Referring to FIG. 1, numeral 1 denotes a suspension arm constituting an article to be supported; a resilient bush 2 is fitted into a support hole 1a at the end of suspension arm 1. The resilient bush 2 comprises a metal inner sleeve 20, a resilient body 21 made of rubber fixed to the circumference of the inner sleeve 20, and a inserted sleeve 22 made of metal embedded in a diametrically intermediate part of the resilient body 21; the resilient bush 2 is constituted in the form of the outer-sleeveless type with the resilient body 21 made to directly contact the inside face of the support hole 1a. A pair of support shafts 3, 3 are inserted into the inner sleeve 20 from both ends in the axial direction, such that flanges 3a, 3a at the base thereof contact both ends of the inner sleeve 20; a bracket 3b extending outwards from the flange 3a of each support shaft 3 is secured to a vehicle body (not shown) at a mounting hole 3c formed therein. Here, of the forces, in the axial direction of the resilient bush 2, acting on suspension arm 1, the force directed in the rightwards direction is larger than the force directed in the leftwards direction in FIG. 1; consequently, the clearance L1 between the flange 3a of the right-hand side support shaft 3 and the right-hand end of the resilient body 21 is made wider than the clearance L2 between the flange 3a of the left-hand side support shaft 3 and the left-hand end of the resilient body 21.

Figure 2A:
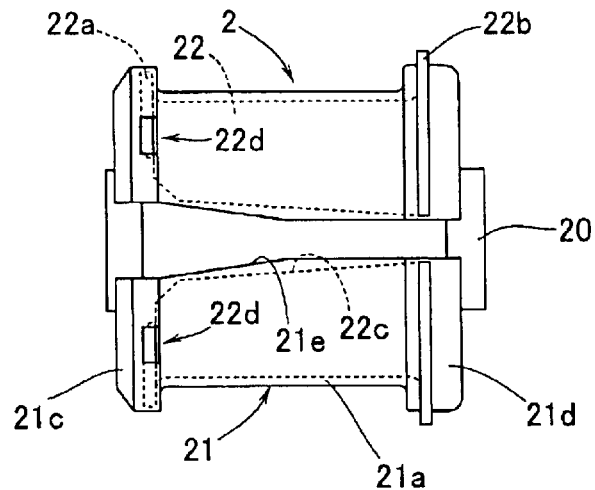
FIG. 2(A) is a side view of the above bush in a free condition.
Figure 2B:
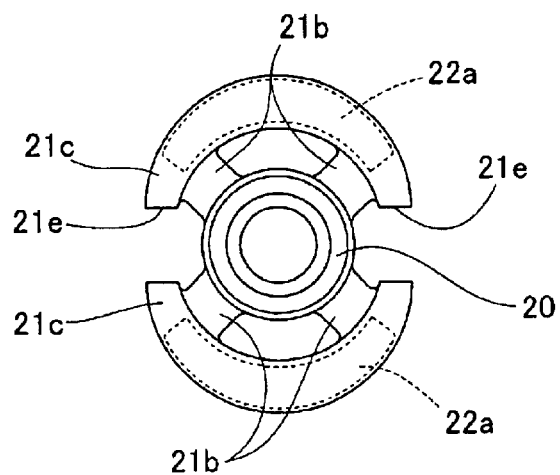
FIG. 2(B) is a front view of the bush of FIG. 2(A) seen from the left-hand side.
Figure 2C:
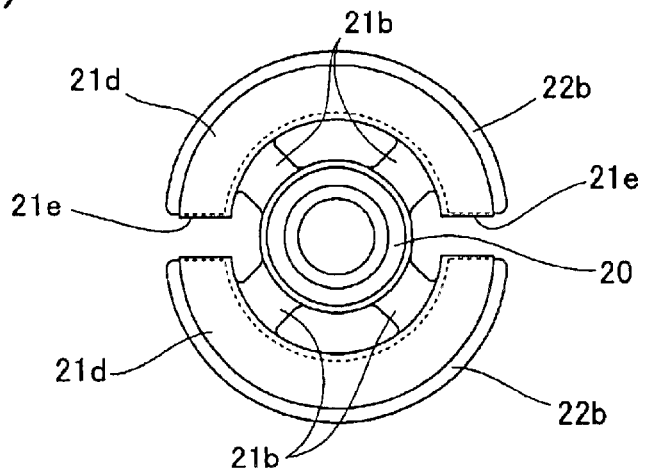
FIG. 2(C) is a rear face view of the bush of FIG. 2(A) seen from the right-hand side.
Figure 3A:
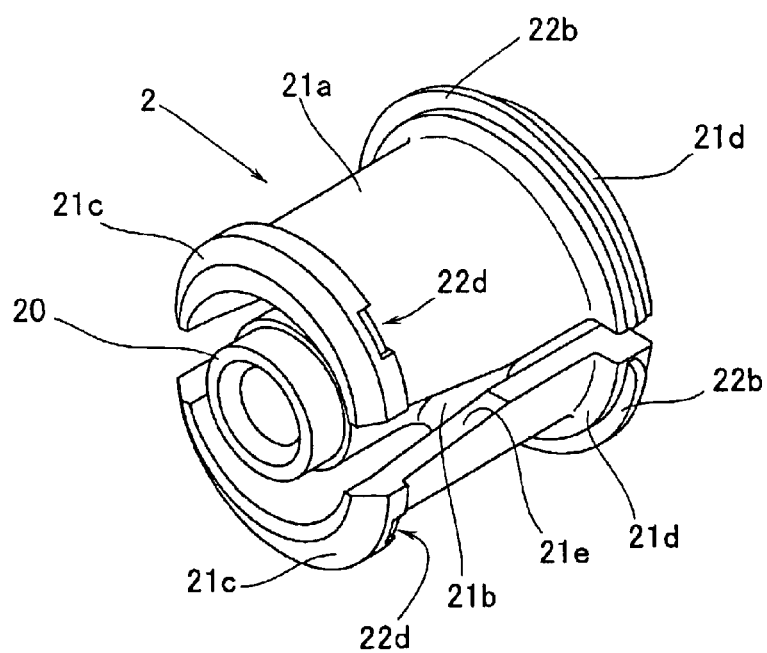
FIG. 3(A) is a perspective view of the above bush in a free condition.
Figure 3B:
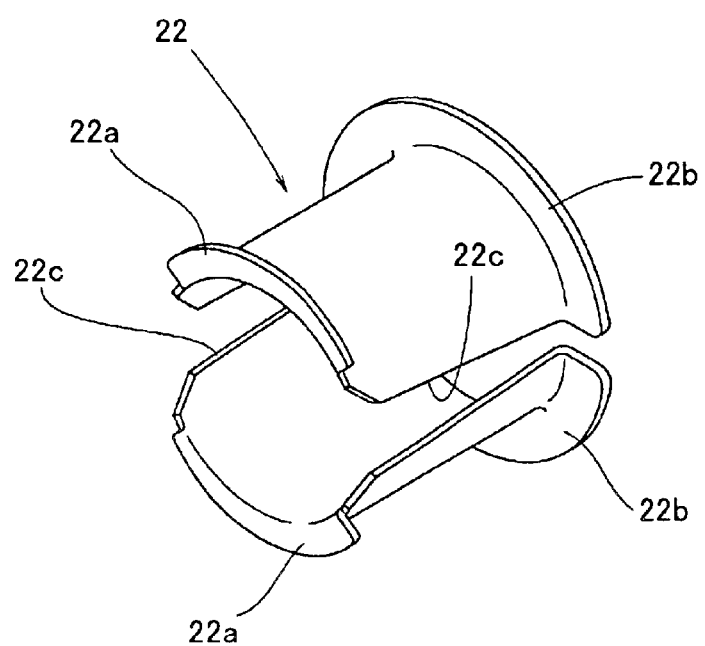
FIG. 3(B) is a perspective view of the inserted sleeve.

The resilient body 21 comprises a tubular portion 21a that fits into the support hole 1a, leg portions 21b formed at a plurality of locations in the circumferential direction of the inner circumference of the central part of the tubular portions 21a and fixed to the inner sleeve 20, and stopper portions 21c, 21d that are formed by expansion in the diametrically outwards direction respectively at one end and the other end in the axial direction of the sleeve 21a, said one end and the other end projecting from support hole 1a in the axial direction; a inserted sleeve 22 is embedded in the sleeve 21a such that it reaches the stops 21c, 21d at both ends. On the inserted sleeve 22, there are formed flanges 22a, 22b that are bent in the diametrically outwards direction within the stops 21c, 21d respectively at the one end and the other end in the axial direction. As shown in FIG. 2(B), here, the flange 22a at one end and the stopper portion 21c at one end are formed in elliptical shape with the short-diameter dimension of same is less than the hole diameter of the support hole 1a and, as shown in FIG. 2(C), the flange 22b at the other end and the stop 21d at the other end are formed of practically circular shape. As shown in FIG. 3(B), notches 22c, 22c extending in a tubular portion of the inserted sleeve 22 are formed positioned on one end flange 22a on both sides in the short-diameter direction of the elliptical shape; also, as shown in FIG. 2(A) and FIG. 3(A), in the sleeve 21a of resilient body 21, split grooves 21e, 21e are formed at the same phases as the notches 22c, 22c, reaching the end face of the one end stop 21c; furthermore, these notches 22c and split grooves 21e are formed in a shape of increasing width towards the one end in the axial direction, and the flange 22a and the stopper portion 21c at the one end are made to be capable of diameter reduction in the long diameter direction of the elliptical shape. It should be noted that, although, in this embodiment, the inserted sleeve 22 and the tubular portion 21a are divided into two halves of respectively halved shape by forming the notches 22c and the split grooves 21e over the entire length of the inserted sleeve 22 and the sleeve 21a, respectively, it would alternatively be possible to make the inserted sleeve 22 and the sleeve 21a respectively of non-divided construction by terminating the notches 22c and the split grooves 21e before flange 22b and the stop 21d at the other end.

Figure 4:
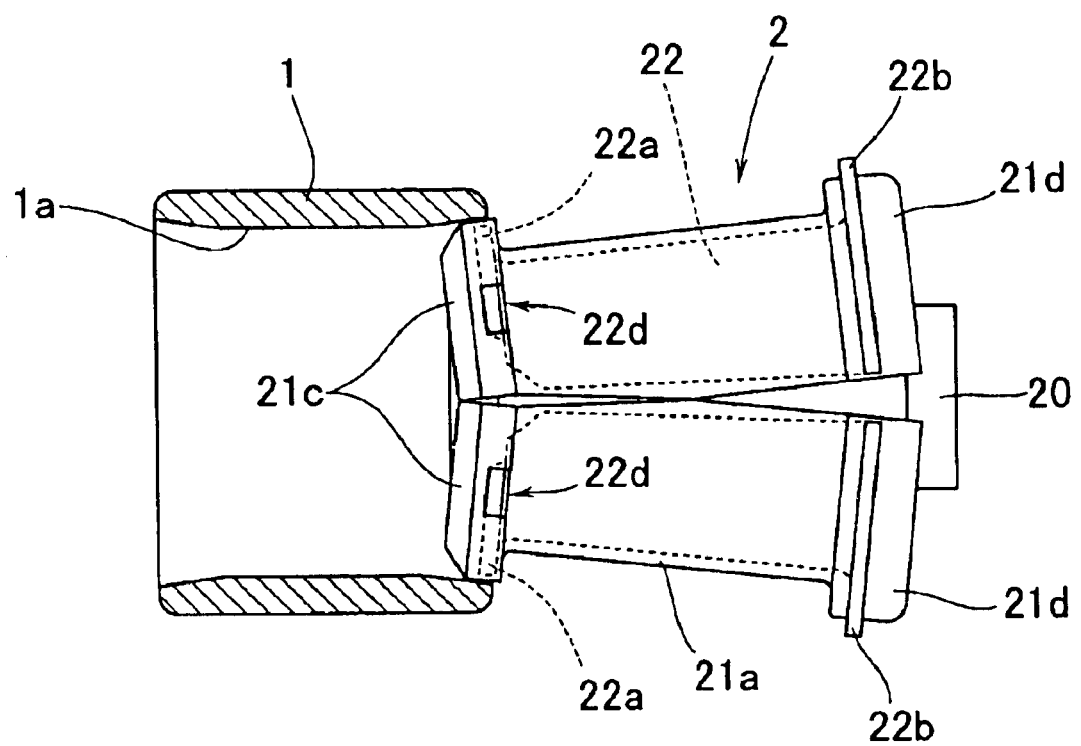
FIG. 4 is a side view illustrating the initial condition in pressure-insertion of the bush into the support hole.
Figure 5A:
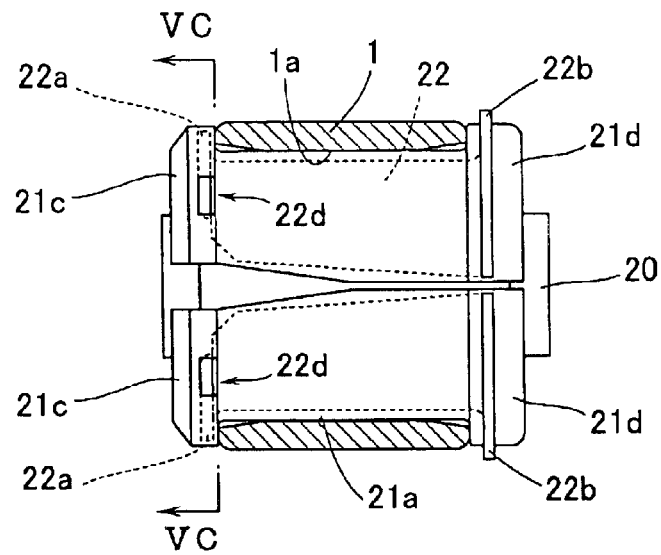
FIG. 5(A) is a side view illustrating the condition in which pressure-insertion of the bush into the support hole has been completed.
Figure 5B:
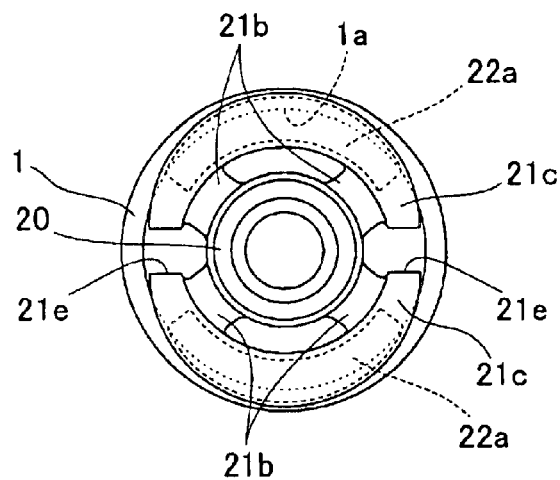
FIG. 5(B) is a front view seen from the left-hand side of FIG. 5(A)

When the resilient bush 2 is fitted into the support hole 1a, the resilient bush 2 is pressure-inserted into the support hole 1a from one end thereof, with the flange 22a and the stop 21c at this one end being reduced in diameter as shown in FIG. 4. In this way, the resilient bush 2 can be pressure-inserted under low load, and excellent pressure-insertion can be achieved without occurrence of catching or breakage etc at the stop 21c at the one end. Thus, when the flange 22a and the stop 21c at the one end are withdrawn from the support hole 1a, these are expanded in diameter as shown in FIGS. 5(A) and (B), and the outside edge portion in the long diameter direction of the flange 22a at the one end extends in the diametrically outwards direction from the projection plane in the axial direction of the support hole 1a. Further, the flange 22b at the other end also extends in the diametrically outwards direction from the projection plane in the axial direction of the support hole 1a; thus, resistance to withdrawal in the one direction and the other direction of the axial direction is obtained by means of the flanges 22a, 22b at the one end and the other end, so the withdrawal load becomes large. However, since the resistance to withdrawal is greater in the case of the flange 22b at the other end, than it is in the case of the flange 22a at the one end, it is desirable that the resilient bush 2 should be fitted into the support hole 1a such that the other-end flange 22b is positioned on the side where the larger of the forces in the axial direction that act on suspension arm 1 acts, i.e. the right-hand side in FIG. 1 and FIG. 5.

Also, if the long-diameter dimension of the one-end flange 22a in the free condition shown in FIG. 2(B) is formed larger than the long-diameter dimension in the condition when the resilient bush 2 is fitted into support hole 1a, the resilient body 21, in particular, the leg portions 21b on the inside of the inserted sleeve 22, can be compressed in the long-diameter direction in the initial condition in which no load acts on the suspension arm 1. Thus, the initial compression ratio of the resilient body 21 can be made large and, as a result, the spring constant of the resilient body 21 in the axial direction and torsional direction can be kept low while the initial compression ratio of the resilient body 21 is made large; performance is thereby improved.

Figure 5C:
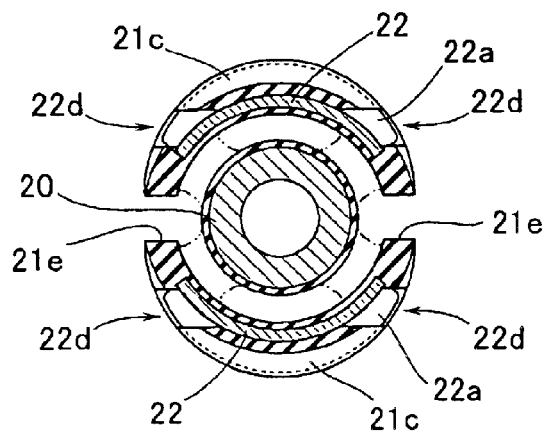
FIG. 5(C) is a cross-sectional view along the line VC-VC of FIG. 5(A)

By the way, although the circumferential edge of the other-end flange 22b of the inserted sleeve 22 projects at the circumference of the other-end stopper portion 21d of the tubular portion 21a, practically all of the one-end flange 22a of the inserted sleeve 22 is embedded in the one-end stop 21c of the sleeve 21a. Here, it is necessary to grasp the other-end flange 22b and the one-end flange 22a together in the forming mold during vulcanizing molding of the resilient body 21, so that displacement of the position of the inserted sleeve 22 does not occur. However, corrosion resistance is lowered at the location where grasp is applied to the one-end flange 22a, since this is then no longer covered by the resilient body 21. Accordingly, in this embodiment, as shown in FIG. 3(A) and FIG. 5(C), the location 22d where grasp is applied to the one-end flange 22a during vulcanizing molding of resilient body 21 is set in a position offset in the circumferential direction from the portion coinciding with the direction of diameter reduction (long-diameter direction) of this flange 22a, so that, even if corrosion occurs at grasping location 22d, the function of prevention of withdrawal by the one-end flange 22a is ensured.

Figure 6A:
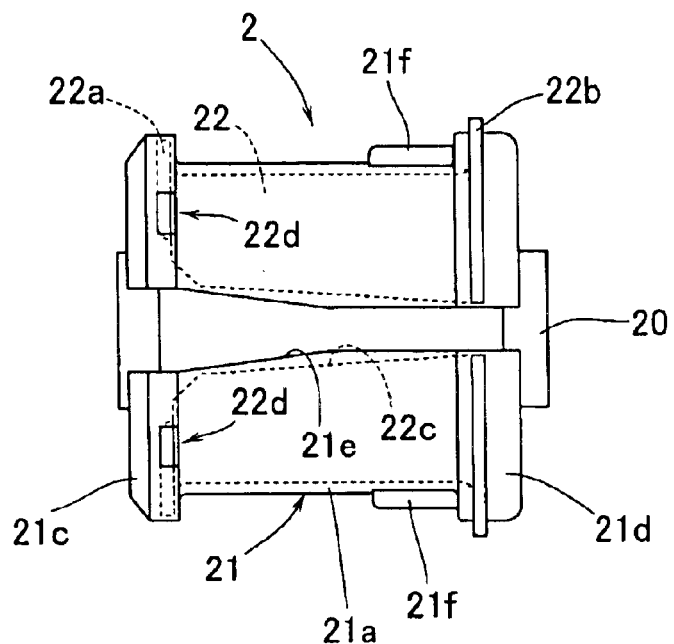
FIG. 6(A) is a side view of the free condition of a second embodiment of a bush according to the present invention.
Figure 6B:
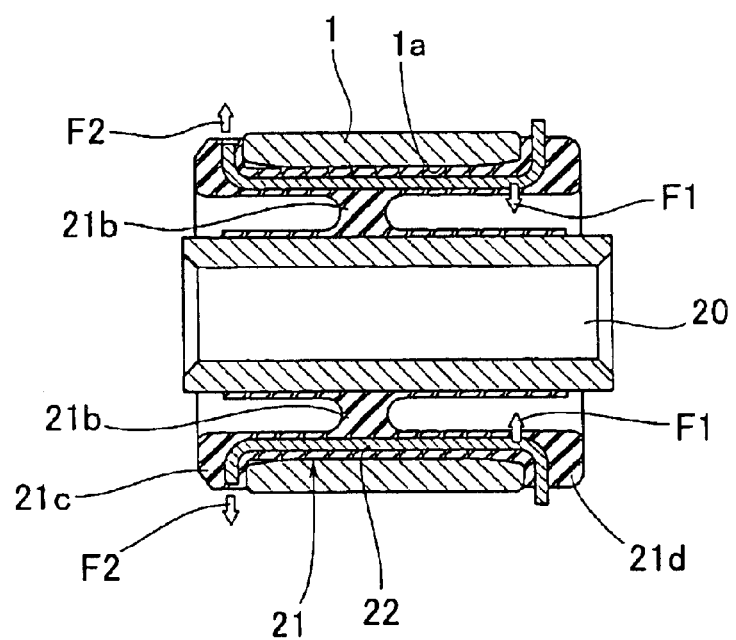
FIG. 6(B) is a cross-sectional side view of the condition after pressure-insertion has been completed.

FIG. 6 shows a second embodiment of the resilient bush 2. In the case of this bush, as shown in FIG. 6(A), projections 21f that project in the diametrical direction are formed at a portion of the outer circumferential surface of the sleeve 21a of the resilient body 2, nearer to the other end, i.e. at a portion on the opposite side to the leading end in the direction of insertion of the resilient bush 2 into the support hole 1a. Otherwise, this embodiment is the same as the first embodiment. In this case, as shown in FIG. 6(B), when the resilient bush 2 is fitted into the supporting hole 1a, the projections 21f are compressed, generating a force F2 such as to expand in diameter the one-end side of the sleeve 21a by a lever action, performed by this compressive force F1 using the leg portions 21b as a fulcrum; the withdrawal prevention function of the one-end flange 22a is thereby reinforced.

Figure 7:
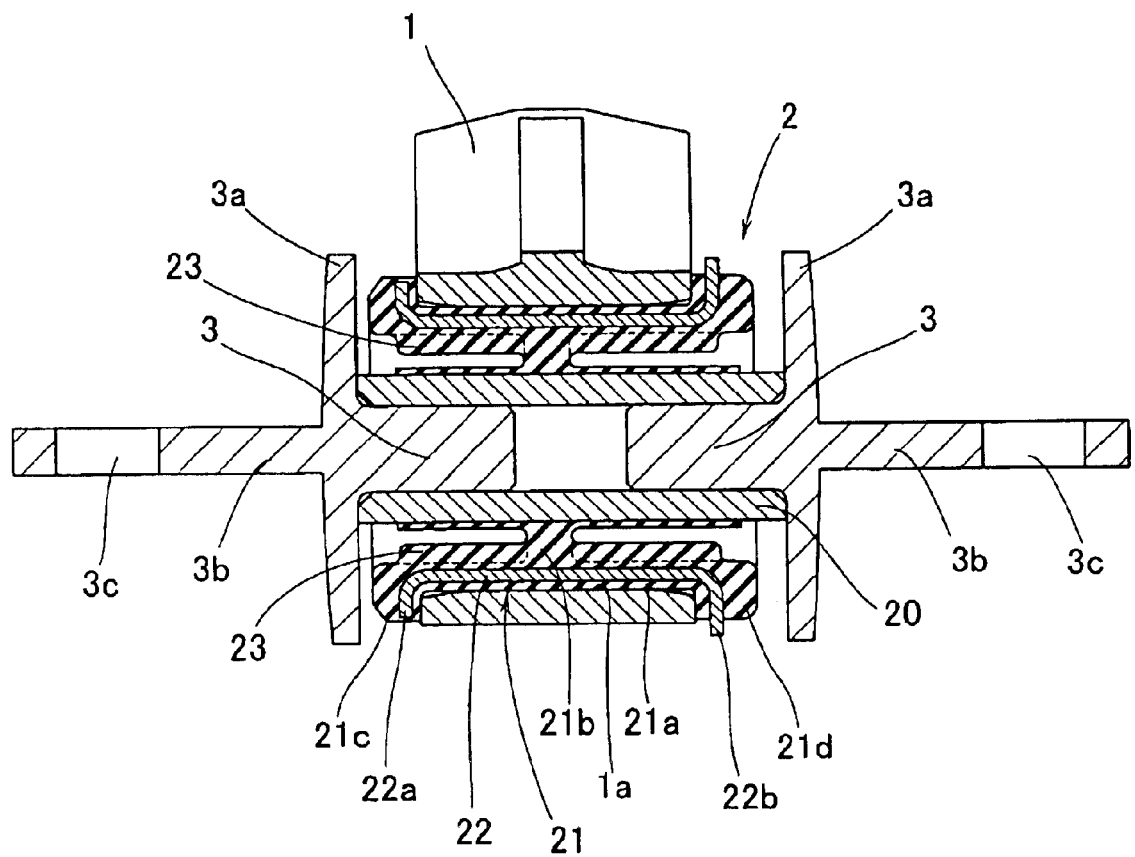
FIG. 7 is a cross-sectional side view of the condition of use of a third embodiment of a bush according to the present invention.
Figure 8A:
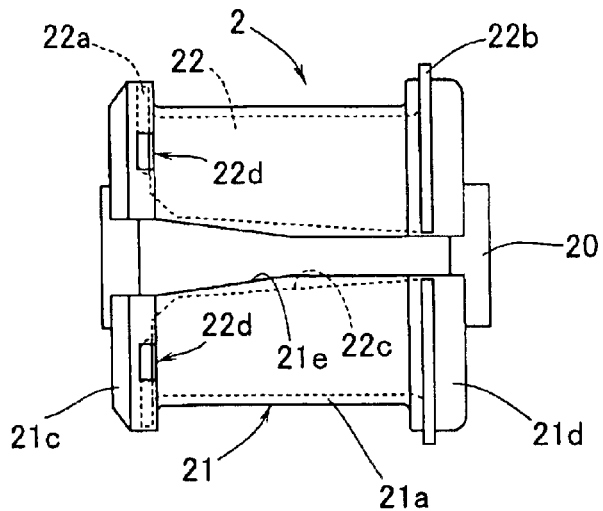
FIG. 8(A) is a side view of the free condition of the bush of FIG. 7.
Figure 8B:
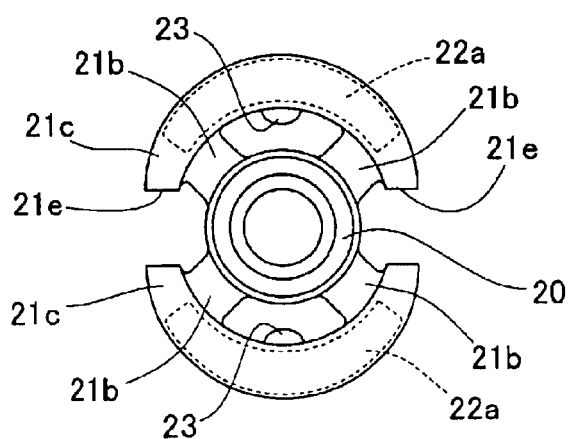
FIG. 8(B) is a front view of the bush seen from the left-hand side of FIG. 8(A)
Figure 8C:
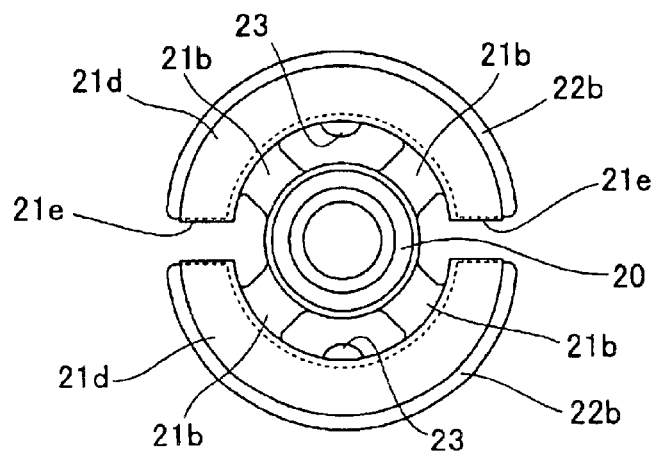
FIG. 8(C) is a rear face view of the bush seen from the right-hand side of FIG. 8(A)

FIG. 7 and FIG. 8 show a third embodiment of the resilient bush 2. The difference between the third embodiment and the first embodiment described above is that rib-shaped diametrical stopper portions 23 project on the inner circumferential surface of the sleeve 21a of the resilient body 21 at the phase coinciding with the long-diameter direction, constituting the diameter reduction direction, of the one-end flange 22a of the inserted sleeve 22. By this means, reduction in diameter of the one-end flange 22a is suppressed by abutment of the diametrical stopper portions 23 with the inner sleeve 20, thereby reinforcing the withdrawal prevention function of the one-end flange 22a. Also, when the resilient bush 2 is pressure-inserted into the support hole 1a, when the one-end flange 22a and the one-end axial stopper portion 21c reach a tapered portion on the one-end side of the support hole 1a, axial thrust is generated by the diametrical expanding force produced by the compression reaction of the diametrical stopper portions 23, thereby enabling pressure-insertion to be performed thoroughly satisfactorily.

Figure 9:
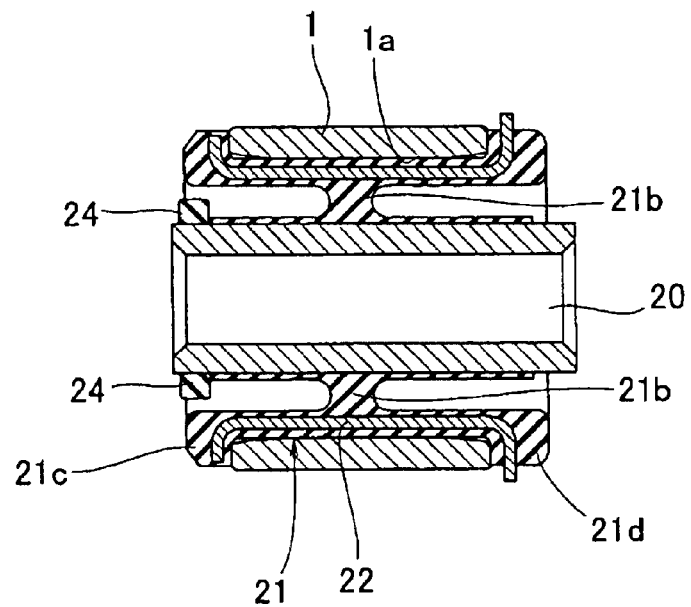
FIG. 9 is a cross-sectional side view of the condition after pressure-insertion of a bush according to a fourth embodiment of the present invention has been completed.

FIG. 9 shows a fourth embodiment of the resilient bush 2. In this embodiment, instead of the diametrical stopper portions 23 of the third embodiment formed on the sleeve 21a of resilient body 21, an annular diametrical stopper portion 24 is provided at the outer circumference of the one end of the inner sleeve 20. In this way, the withdrawal prevention function of the one-end flange 22a is reinforced in the same way as in the third embodiment, by suppression of reduction in diameter of the one-end flange 22a of the inserted sleeve 22 by abutment of the one-end axial stopper portion 21c of the sleeve 21a with the diametrical stopper portion 24. Further, this diametrical stopper portion 24 may be divided and provided on both sides in the long-diameter direction.

Figure 10:
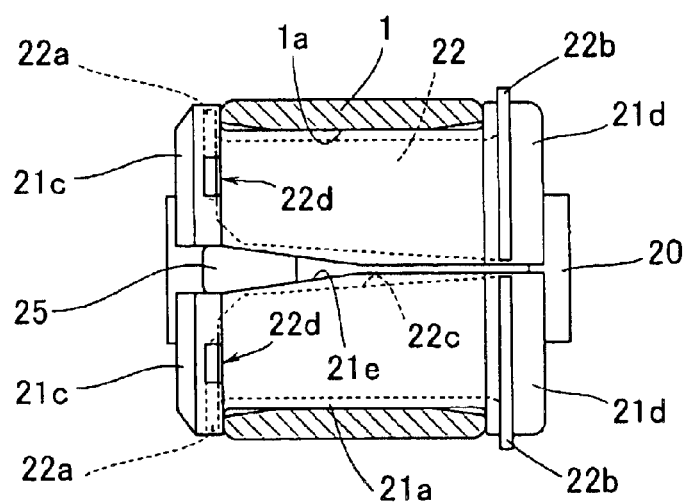
FIG. 10 is a side view of the condition after pressure-insertion of a bush according to a fifth embodiment of the present invention has been completed.

FIG. 10 shows a fifth embodiment of the resilient bush 2. In this embodiment, wedge members 25 are provided that are fitted in from one end into the split grooves 21e of the sleeve 21a. Reduction in diameter of the one-end axial stop 21c of the sleeve 21a is thereby suppressed and concurrent reduction in diameter of the one-end flange 22a of the inserted sleeve 22 is also suppressed and the withdrawal prevention function of the one-end flange 22a is thereby reinforced in the same way as in the case of the third and fourth embodiments. Also, in the case of this fifth embodiment, there is also the advantage that the pressure-insertion load can be reduced, by pressure-inserting the resilient bush 2 into the support hole 1a in a condition with the wedge members 25 removed.

Although, hereinabove, embodiments in which the present invention was applied to a resilient bush 2 that supports a suspension arm 1 were described, the present invention could likewise be applied also to resilient bushes that support an article to be supported other than a suspension arm.

Next, a method of pressure-insertion of the resilient bush 2 into the support hole 1a of the article 1 to be supported will be described.

Figure 11A:
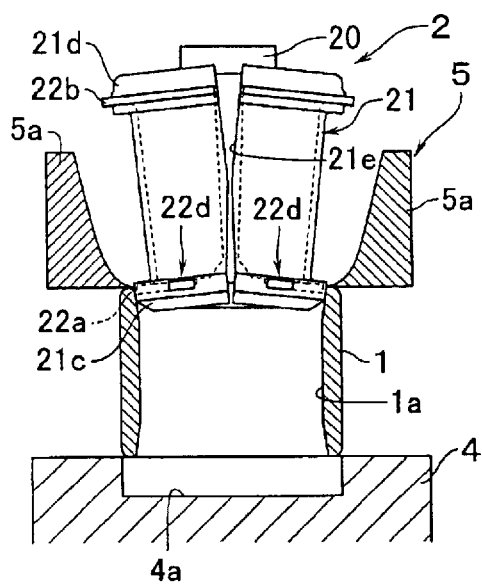
FIG. 11(A) is a cross-sectional side view illustrating the initial condition of a bush pressure-insertion operation using a diameter reduction guide according to a first embodiment of the method of the present invention.
Figure 11B:
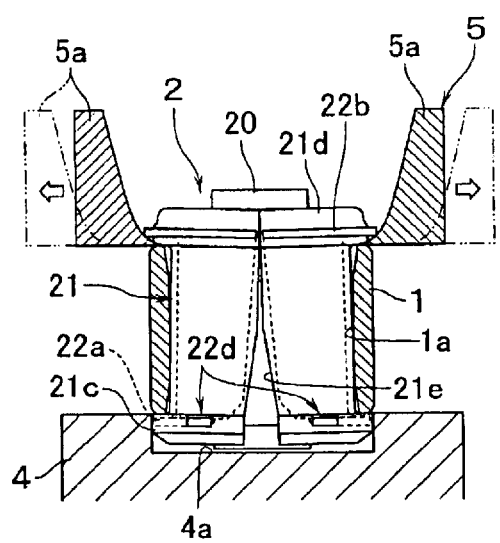
FIG. 11(B) is a cross-sectional side view illustrating the condition in which this pressure-insertion operation has been completed.
Figure 11C:
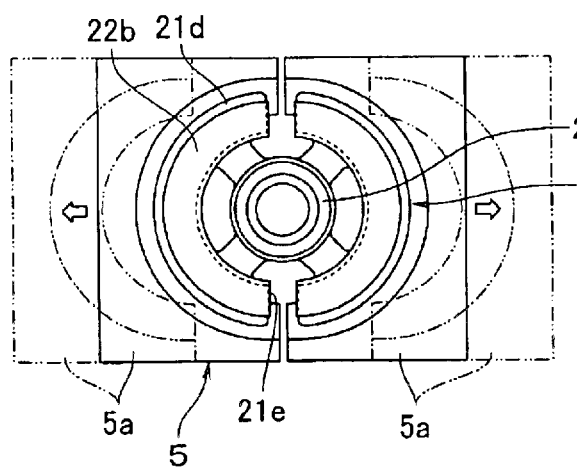
FIG. 11(C) is a plan view seen from above FIG. 11(B)

As shown in FIG. 11(A), when the resilient bush 2 is pressed into the support hole 1a, the aperture face on the outlet side of the support hole 1a of the article 1 to be supported is brought into contact with a fixing jig 4 and an annular diameter reduction guide 5 is arranged at the aperture face at the inlet side of the support hole 1a of the article 1 to be supported; pressure-insertion of the resilient bush 2 into the support hole 1a is thereby effected from the one-end side thereof through the diameter reduction guide 5. Here, the diameter reduction guide 5 is formed such that the internal diameter thereof becomes smaller as the support hole 1a is approached and guidance into the support hole 1a is thereby effected as reduction in diameter is performed by pressing in the one-end flange 22a and the stop 21c into the diameter reduction guide 5. As shown in FIG. 11(B), in the condition in which pressure-insertion has been completed, the one-end flange 22a and the stop 21c are extruded from the outlet of the support hole 1a and the other end flange 22b is somewhat reduced in diameter on reaching the vicinity of the end of the diameter reduction guide 5 on the side nearest the support hole 1a. Here, as shown in FIG. 11(C), the diameter reduction guide 5 is constituted by two segments 5a, 5a which can be freely opened and closed in the diametrical direction; the diameter reduction guide 5 is thereby separated after pressure-insertion of the resilient bush 2 has been effected, by opening these two segments 5a, 5a in the diametrical direction.

Figure 11D:
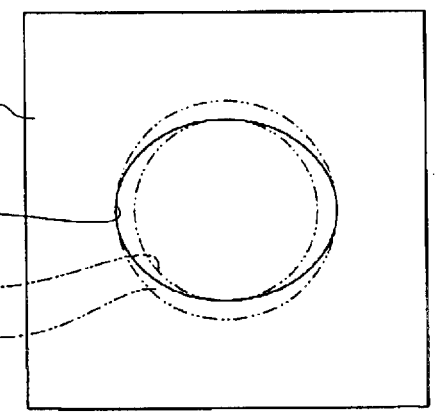
FIG. 11(D) is a plan view of a fixing jig.

Also, the fixing jig 4 is provided with a concavity 4a for accepting the one-end flange 22a and the stop 21c extruded from the support hole 1a. As shown in FIG. 11(D), the concavity 4a is formed in an elliptical shape whose long-diameter direction is the direction parallel with the width direction of the notches 22c, i.e. the long-diameter direction of the ellipse constituting the shape of the one-end flange 22a and the stop 21c. This thereby permits diametrical expansion within concavity 4a of the one-end flange 22a and the stop 21c extruded from the support hole 1a. The one-end flange 22a and the stop 21c are therefore not subjected to strong pressure contact with the inside face of the concavity 4a, so catching thereof on the fixing jig 4 is thereby prevented. It should be noted that the pressure-insertion load is securely received by abutment of the fixing jig 4 with the outlet side aperture face of the support hole 1a at the upper surface portion on both sides in the short-diameter direction of the concavity 4a.

Figure 12A:
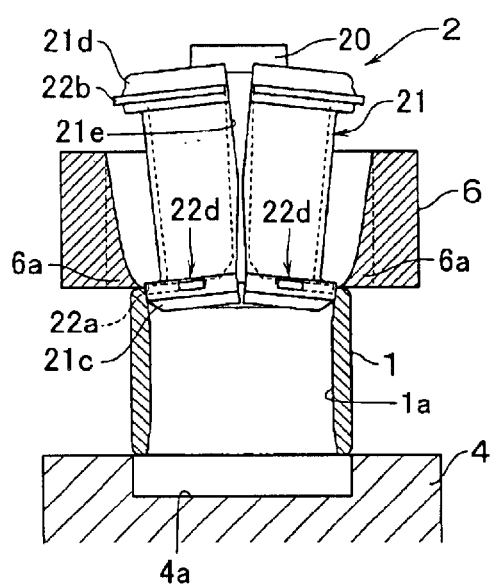
FIG. 12(A) is a cross-sectional side view illustrating the initial condition of a bush pressure-insertion operation using a diameter reduction guide according to a second embodiment.
Figure 12B:
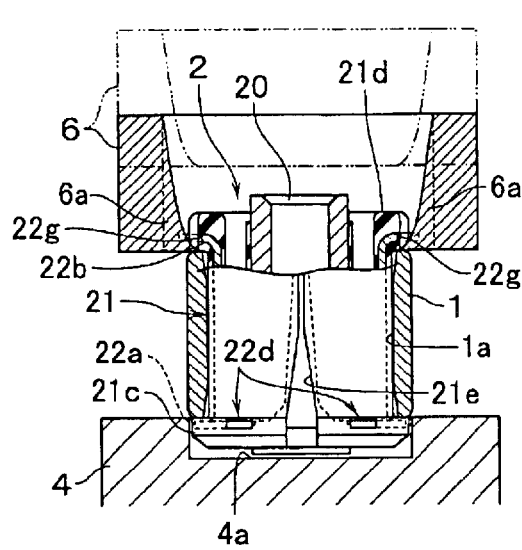
FIG. 12(B) is a cross-sectional side view illustrating the condition in which this pressure-insertion operation has been completed.
Figure 12C:
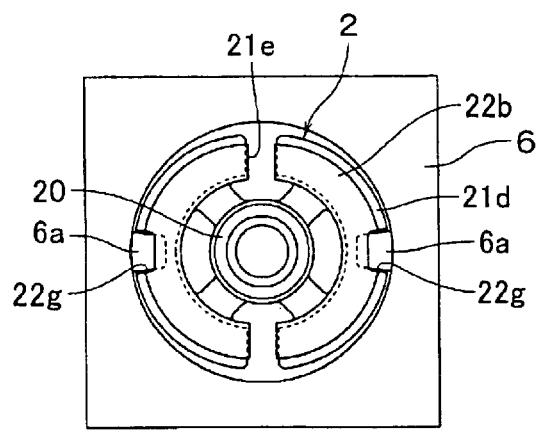
FIG. 12(C) is a plan view seen from above FIG. 12(B)

The diameter reduction guide is not restricted to that described above and a diameter reduction guide 6 could be employed as shown in FIGS. 12(A), 12(B) and 12(C). This diameter reduction guide 6 is of annular shape and is provided with guide projections 6a, the amount of whose projection increases in the diametrically inwards direction as the support hole 1a is approached, at a plurality of locations in the circumferential direction of the inner circumference of diameter reduction guide 6, for example on both sides in the long-diameter direction of the one-end flange 22a and the stop 21c; the one-end flange 22a and the stop 21c are thus reduced in diameter by the guide projections 6a. Also, as shown in FIG. 12(C), recesses 22g are formed at a plurality of locations in the circumferential direction on the other-end flange 22b, in the same phase as the guide projections 6a. In this way, when the diameter reduction guide 6 is moved in the axial direction after pressure-insertion of the resilient bush 2, separation of the diameter reduction guide 6 from the resilient bush 2 in the axial direction can be achieved without creating interference with the other end flange 22b, by passing the guide projections 6a through the recesses 22g.

Figure 13A:
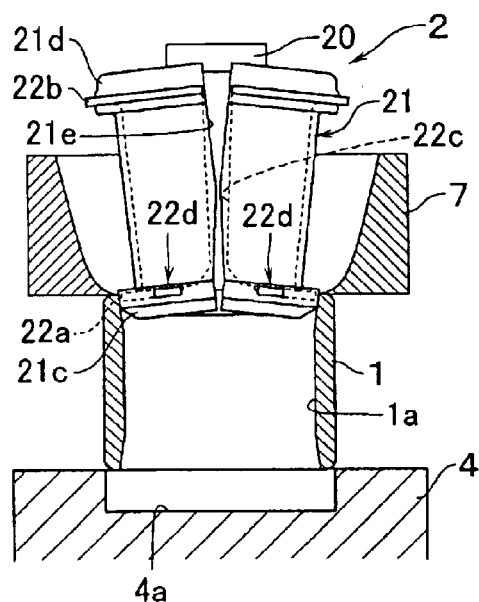
FIG. 13(A) is a cross-sectional side view illustrating the initial condition of a bush pressure-insertion operation using a diameter reduction guide according to a third embodiment.
Figure 13B:
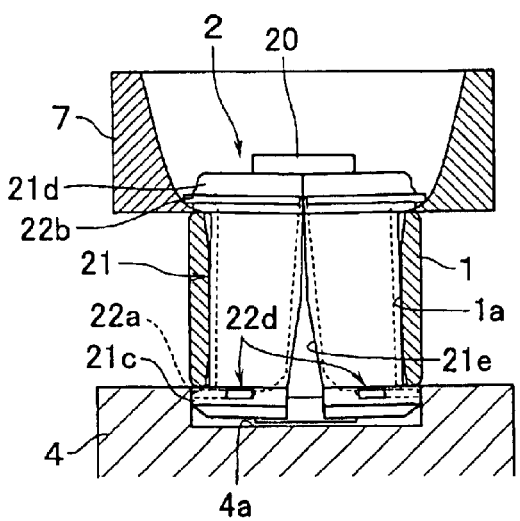
FIG. 13(B) is a cross-sectional side view illustrating the condition in which this pressure-insertion operation has been completed.
Figure 13C:
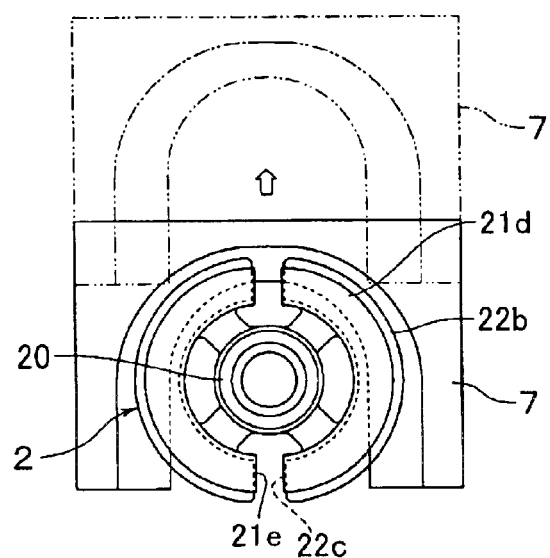
FIG. 13(C) is a plan view seen from above FIG. 13(B).

Also, a diameter reduction guide 7 could be employed as shown in FIGS. 13(A), 13(B), and 13(C). This diameter reduction guide 7 is formed with an internal diameter that decreases as the support hole 1a is approached and in this respect is the same as the diameter reduction guide 5 shown in FIG. 11; however, in contrast to that shown in FIG. 11, it is formed with a practically U-shaped opening on one side in the diametrical direction coinciding with the above-mentioned notch 22c, i.e. on one side in the short-diameter direction of the one-end flange 22a and the stop 21c. In this way, after pressure-insertion of the resilient bush 2, this diameter reduction guide 7 can be separated from the resilient bush 2 by moving the diameter reduction guide 7 in the opposite direction to the opening direction thereof, i.e. in the other of the short-diameter directions. It should be noted that, when either of the diameter reduction guide 6 of FIG. 12 or the diameter reduction guide 7 of FIG. 13 is employed, just as in the case where the diameter reduction guide 5 of FIG. 11 is employed, the pressure-insertion operation is performed by bringing an aperture face on the outlet side of the support hole 1a of the article 1 to be supported into contact with the fixing jig 4 which is formed with the elliptical concavity 4a.

What is claimed is:

1. A resilient bush used to, by fitting into a support hole formed in an article to be supported, resiliently support the article comprising:

an inner sleeve;

a resilient body that directly contacts the inside face of the support hole and is fixed to the outer circumference of the inner sleeve; and an inserted sleeve embedded in a diametrically intermediate part of the resilient body, characterized in that flanges bent in a diametrically outwards direction are formed at both ends of the inserted sleeve, the flanges at both ends extending in the diametrically outwards direction from a projection plane in an axial direction of the support hole in a condition in which the resilient bush is fitted into the support hole and a notch extending in a tubular portion of the inserted sleeve is formed in at least part, in the circumferential direction, of the flange at one end such that the flange at one end being capable of being reduced in diameter, the flange at one end being one of the flanges at both ends which is positioned at the leading end of the resilient bush in a direction of insertion of same with respect to the support hole.

2. The resilient bush according to claim 1, characterized in that a split groove reaching the end face of the leading end in said direction of insertion is formed in said resilient body in the same phase as said notch, and this split groove and said notch are respectively formed in shapes expanding in width towards the leading end in said direction of insertion.

3. The resilient bush according to claim 1 or 2, characterized in that said flange at one end is formed in elliptical shape with the short-diameter dimension being less than the hole diameter of said support hole and said notch is formed on both sides in the short-diameter direction of this flange.

4. The resilient bush according to claim 1 or 2, characterized in that a projection is formed projecting in the diametrical direction in a portion of the outer circumferential surface of said resilient body on the opposite side to that of the leading end in said insertion direction.

5. The resilient bush according to claim 1 or 2, characterized in that a location where said flange at one end is subjected to grasp during vulcanizing molding of said resilient body is offset in the circumferential direction from a portion coinciding with the direction of reduction of diameter of this flange at one end.

6. A resilient bush used to, by fitting into a support hole formed in the article to be supported, resiliently support the article, comprising:

an inner sleeve;

a resilient body having a tubular portion that directly contacts the inside face of the support hole and is formed with leg portions fixed to the inner sleeve at the inner circumference of an intermediate portion in an axial direction of the tubular portion; and an inserted sleeve embedded in the tubular portion of the resilient body, characterized in that flanges bent in a diametrically outwards direction are formed at both ends of the inserted sleeve, the flanges at both ends extending in the diametrically outwards direction from a projection plane in the axial direction of the support hole in a condition in which the resilient bush is fitted into the support hole; and a notch extending in a tubular portion of the inserted sleeve is formed in at least part, in a circumferential direction, of the flange at one end such that the flange at one end is capable of being reduced in diameter, the flanges at one end being one of the flanges at both ends which is positioned at the leading end of the resilient bush in the direction of insertion of same with respect to the support hole and in that a diametrical stopper portion is provided on one of the inner sleeve and the tubular portion of the resilient body that restricts reduction in diameter by abutting the other of the inner sleeve and the tubular portion of the resilient body when the flange at one end is reduced in diameter.

7. A resilient bush used to, by fitting into a support hole formed in an article to be supported, resiliently support the article to be supported, comprising:

an inner sleeve;

a resilient body having a tubular portion that directly contacts the inside face of the support hole and is formed with leg portions fixed to the inner sleeve at the inner circumference of an intermediate portion in an axial direction of the tubular portion; and an inserted sleeve, embedded in the tubular portion of the resilient body, characterized in that flanges bent in a diametrically outwards direction are formed at both ends of the inserted sleeve, the flanges at both ends extending in the diametrically outwards direction from a projection plane in the axial direction of the support hole in a condition in which the resilient bush is fitted into the support hole; and a notch extending in a tubular portion of the inserted sleeve are formed in at least part, in a circumferential direction, of the flange at one end such that the flange at one end is capable of being reduced in diameter, the flange at one end being one of the flanges at both ends which is positioned at the leading end of the resilient bush in the direction of insertion of same with respect to the support hole, and in that a split groove in the same phase as said notch and that reaches the end face at the leading end in said direction of insertion are formed in the tubular portion of the resilient body, a wedge member being provided that fit into the split groove.

8. A method of pressure-insertion, into a support hole, of a resilient bush used to, by fitting into a support hole formed in an article to be supported, resiliently support the article, the resilient bush comprising:

an inner sleeve;

a resilient body that directly contacts the inside face of the support hole and is fixed to the outer circumference of the inner sleeve; and an inserted sleeve embedded in a diametrically intermediate part of the resilient body, in which flanges are formed at both ends of the inserted sleeve, extending in an diametrically outwards direction from a projection plane in an axial direction of the support hole in a condition in which the resilient bush is fitted into the support hole; and a notch extending in a tubular portion of the inserted sleeve is formed in at least part, in a circumferential direction, of the flange at one end such that the flange at one end is capable of being reduced in diameter, the flange at one end being one of the flanges at both ends which is positioned at the leading end of the resilient bush in a direction of pressure-insertion of same with respect to the support hole, characterized in that an annular diameter reduction guide, whose internal diameter reduces with approach to the support hole, is arranged at an aperture face on an inlet side of the support hole of the article to be supported, and said flange at one end of the inserted sleeve is arranged to be guided into the support hole by diameter reduction performed by pressing the flange into the diameter reduction guide; and the diameter reduction guide is constituted by a plurality of segments that can be opened and closed in the diametrical direction, these segments being opened in the diametrical direction after pressure-insertion of the resilient bush.

9. A method of pressure-insertion, into a support hole, of a resilient bush used to, by fitting into a support hole formed in an article to be supported, resiliently support the article, the resilient bush comprising:

an inner sleeve;

a resilient body that directly contacts the inside face of the support hole and is fixed to the outer circumference of the inner sleeve; and an inserted sleeve embedded in a diametrically intermediate part of the resilient body, in which flanges are formed at both ends of the inserted sleeve, extending in a diametrically outwards direction from a projection plane in an axial direction of the support hole in a condition in which the resilient bush is fitted into the support hole; and a notch extending in a tubular portion of the inserted sleeve is formed in at least part, in a circumferential direction, of the flange at one end such that the flange at one end is capable of being reduced in diameter, the flange at one end being one of the flanges at both ends which is positioned at the leading end of the resilient bush in the direction of pressure-insertion of same with respect to the support hole, characterized in that an annular diameter reduction guide is arranged at an aperture face on the inlet side of the support hole of the article to be supported, guide projections, the amount of whose projection diametrically inwards increases with approach to the support hole, being provided at a plurality of locations in the circumferential direction of the inner circumference of the diameter reduction guide, said flange at one end of the inserted sleeve being arranged to be guided into the support hole by diameter reduction performed by the guide projections by pressing the flange into the diameter reduction guide; and recesses are formed at a plurality of locations in the circumferential direction in the same phase as the guide projections in the flange at the other end of the inserted sleeve, the diameter reduction guide being arranged to be separated in the axial direction such that the guide projections pass through the recesses after pressure-insertion of the resilient bush.

10. A method of pressure-insertion, into a support hole, of a resilient bush used to, by fitting into a support hole formed in the article to be supported, resiliently support the article, the resilient bush comprising:

an inner sleeve;

a resilient body that directly contacts the inside face of the support hole and is fixed to the outer circumference of the inner sleeve; and an inserted sleeve embedded in a diametrically intermediate part of the resilient body, in which flanges are formed at both ends of the inserted sleeve, extending in a diametrically outwards direction from a projection plane in an axial direction of the support hole in a condition in which the resilient bush is fitted into the support hole; and a notch extending in a tubular portion of the inserted sleeve is formed in at least part, in a circumferential direction, of the flange at one end such that the flange at one end is capable of being reduced in diameter, the flange at one end being one of the flanges at both ends, positioned at the leading end of the resilient bush in a direction of pressure-insertion of same with respect to the support hole, characterized in that a practically U-shaped diameter reduction guide is arranged at an aperture face on the inlet side of the support hole of the article to be supported, whose internal diameter decreases as the support hole is approached and which opens on one side in the diametrical direction matching said notch, guidance into the support hole being effected by diameter reduction of said flange at one end of the inserted sleeve by pressing the flange into the diameter reduction guide and;

the diameter reduction guide being arranged to be separated in the direction opposite to the direction of opening of this guide after pressure-insertion of the resilient bush.

11. A method of pressure-insertion, into a support hole, of a resilient bush used to, by fitting into a support hole formed in an article to be supported, resiliently support the article to be supported, the resilient bush comprising:

an inner sleeve;

a resilient body that directly contacts the inside face of the support hole and is fixed to the outer circumference of the inner sleeve; and an inserted sleeve embedded in a diametrically intermediate part of the resilient body, in which flanges are formed at both ends of the inserted sleeve, extending in a diametrically outwards direction from a projection plane in an axial direction of the support hole in a condition in which the resilient bush is fitted into the support hole; and a notch extending in a tubular portion of the sleeve insert is formed in at least part, in a circumferential direction, of the flange at one end such that the flange at one end is of the flange at one end such that the flange at one end is capable of being reduced in diameter, the flange at one end being one of the flanges at both ends which is positioned at the leading end of the resilient bush in the direction of pressure-insertion of same with respect to the support hole, characterized in that the aperture face on the outlet side of the support hole of the article to be supported is contacted to a fixing jig so as to receive the pressure-insertion load of the resilient bush a concavity being formed in the fixing jig that receives said flange, at one end of the inserted sleeve, when this is extruded from the outlet of the support hole on completion of pressure-insertion of the resilient bush, this concavity being formed in elliptical shape whose long-diameter direction is a direction parallel with the width direction of said notch.

* * * * *